US007892637B2

(12) United States Patent
Allen et al.

(10) Patent No.: US 7,892,637 B2
(45) Date of Patent: Feb. 22, 2011

(54) ART SURFACE AND METHOD FOR PREPARING SAME

(75) Inventors: Kenneth L. Allen, Canton, TX (US); Robert W. Cannon, Mineola, TX (US)

(73) Assignee: RTISTX LLC, Canton, TX (US)

( * ) Notice: Subject to any disclaimer, the term of this patent is extended or adjusted under 35 U.S.C. 154(b) by 279 days.

(21) Appl. No.: 11/329,723

(22) Filed: Jan. 10, 2006

(65) Prior Publication Data

US 2006/0121806 A1 Jun. 8, 2006

Related U.S. Application Data

(63) Continuation-in-part of application No. 11/006,108, filed on Dec. 7, 2004, now Pat. No. 7,615,279.

(51) Int. Cl.
*B32B 27/08* (2006.01)

(52) U.S. Cl. ............... 428/319.3; 428/319.7; 428/319.9

(58) Field of Classification Search ................... 442/59, 442/164; 428/319.3, 319.7
See application file for complete search history.

(56) References Cited

U.S. PATENT DOCUMENTS

| | | | |
|---|---|---|---|
| 1,873,945 A | | 8/1932 | Kraenzlein et al. |
| 4,065,596 A | | 12/1977 | Groody |
| 4,207,366 A | | 6/1980 | Tyler |
| 5,340,386 A | | 8/1994 | Vincent et al. |
| 5,360,664 A | | 11/1994 | Hamm |
| 5,376,183 A | * | 12/1994 | Gatt et al. .................... 134/40 |
| 5,773,138 A | * | 6/1998 | Seethamraju et al. ........ 428/326 |
| 5,863,638 A | | 1/1999 | Harvey |
| 6,127,019 A | | 10/2000 | Means |
| 6,258,412 B1 | | 7/2001 | Ewing |
| 6,316,075 B1 | * | 11/2001 | Desai et al. .................. 428/87 |
| 6,423,379 B1 | | 7/2002 | Ewing |
| 6,468,643 B1 | * | 10/2002 | Kanbayashi et al. ..... 428/293.7 |
| 6,863,972 B2 | * | 3/2005 | Burger et al. ............ 428/319.3 |
| 2002/0009622 A1 | | 1/2002 | Goodson |
| 2003/0051623 A1 | | 3/2003 | Ellis, II |
| 2004/0202960 A1 | | 10/2004 | Ellis, II |
| 2005/0208202 A1 | * | 9/2005 | Sandor ........................ 427/11 |
| 2006/0032175 A1 | * | 2/2006 | Chen et al. .................... 52/578 |
| 2006/0121320 A1 | | 6/2006 | Allen |
| 2007/0066729 A1 | * | 3/2007 | Sharma et al. .............. 524/230 |

OTHER PUBLICATIONS

Canvas from Wikipedia, http://en.wikipedia.org/wiki/canvas, Mar. 12, 2010, 4 pages.*

* cited by examiner

*Primary Examiner*—Hai Vo
(74) *Attorney, Agent, or Firm*—Scott T. Griggs; Griggs Bergen LLP

(57) ABSTRACT

An art surface and a method for preparing the same are disclosed. In one embodiment, a coating is disposed on a thermoplastic compatible surface of a substrate. The coating includes a reaction product of a thermoplastic, at least one cellulose fiber, and acetone. Further, the coating is able to accept one or more artistic media such as acrylic, chalk, charcoal, colored pencil, conte, dyes, egg tempera, oil, pastel, or water color, for example.

22 Claims, 1 Drawing Sheet

ART SURFACE AND METHOD FOR PREPARING SAME

PRIORITY STATEMENT & CROSS-REFERENCE TO RELATED APPLICATIONS

This application is a continuation-in-part of U.S. patent application Ser. No. 11/006,108, entitled "Art Surface and Method for Preparing Same" and filed on Dec. 7, 2004, now U.S. Pat. No. 7,615,279 in the name of Kenneth Allen; which is hereby incorporated by reference for all purposes.

TECHNICAL FIELD OF THE INVENTION

This invention relates, in general, to artist's boards and, in particular, to an art surface that is able to accept and retain a wide variety of artistic mediums including mixed media.

BACKGROUND OF THE INVENTION

Traditionally, art surfaces have included art boards having substrates such as canvas, wood panels, and paper while artist's media have included pencil, charcoal, pastels, inks, and paints, for example. The choice of board depends on the choice of medium since each of the artist's boards interacts differently with the various media and, typically, an artist's board is suitable with only a limited number of media. An ideal artist's board must accept the chosen medium while permitting the artist to modify and/or remove the medium from the surface of the board during development of the work. Further, the ideal artist's board retains the artist's final work while avoiding cracking, warping, and loss of integrity over time. Consequently, the selection of board and medium is critical and a need has arisen for an artist's board which accepts and retains a greater number of media.

SUMMARY OF THE INVENTION

An art surface and a method for preparing the same are provided. In one embodiment, a coating is disposed on a thermoplastic compatible surface of a substrate. The coating includes a reaction product of a thermoplastic, at least one cellulose fiber, and acetone. Further, the coating is able to accept one or more artistic media such as acrylic, chalk, charcoal, colored pencil, conte, dyes, egg tempera, oil, pastel, or water color, for example.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
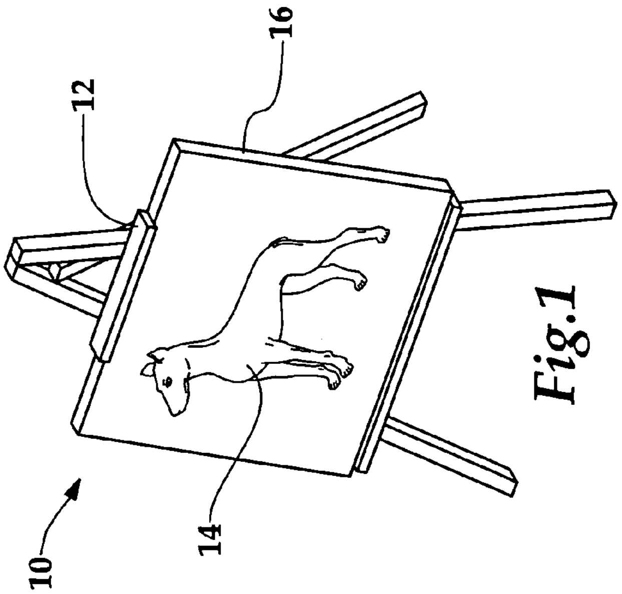
FIG. 1 is a perspective view of one embodiment of an art surface that has been utilized to create a mixed media art work.

Referring initially to FIG. 1, a mixed media art work 10 is presented. An easel 12, which is depicted as a collapsible tripod easel, supports the art work 10 while the artist paints a painting 14 onto an art surface 16 that has been treated with a coating prepared in accordance with the teachings presented herein.

The medium or media selected by the artist may be applied by brush, spray gun, roller, or dipping, for instance. By way of example and not by way of limitation, a few of the more common media that may be utilized with the art surface will be briefly discussed to illustrate the diversity of media accepted by the art surface 16. Acrylic is a water-based "plastic" paint that is thicker and stronger than tempera or watercolor paint. Conte is a modern pencil lead that includes black, red, or brown chalk. Egg tempera is a water-based paint made with an egg yoke binder. Oil is the dominate painting media that offers great versatility, ease of manipulation, and lack of color change when the work dries. Pastels are colors available in stick form that range from soft to brilliant. Water color is a translucent, water-based paint that is available in cake or tube form. Other media including chalk, charcoal, colored pencil, and dyes may also be utilized with the art surface. As previously mentioned, the art surface permits any of the aforementioned media to be utilized alone or in a mixed media art work.

The art surface 16 includes a substrate having a thermoplastic compatible surface and a coating disposed on the thermoplastic compatible surface. The coating includes a reaction product of a thermoplastic and a cellulose fiber. The coating enables the art surface 16 to accept a wide variety of media. Further, the effects of the art surface 16 are very favorable. For example, layers are easy to build on the art surface 16 and colors remain very true after drying on the art surface 16.

Figure 2:
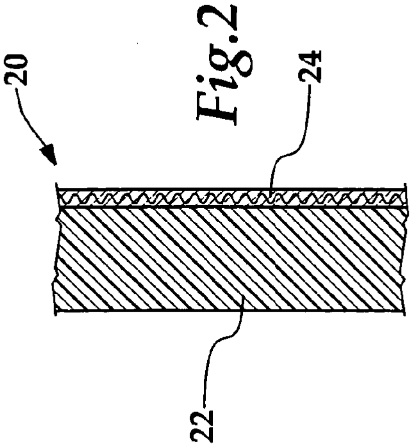
FIG. 2 is a side cross sectional view of one embodiment of an art surface.

FIG. 2 depicts one embodiment of an art surface 20 which comprises a substrate 22 having a coating 24 disposed thereon. In one implementation, the substrate 22 includes a thermoplastic compatible surface material that may comprise polycarbonate substrates, acrylic substrates, impact modified acrylic substrates, vinyl substrates, polyvinyl chloride (PVC) substrates, or acrylonitrile butadiene styrene (ABS) substrates, for example. PVC substrates and ABS substrates, which are rigid, foamed, closed-cell structures, have been found to be particularly suitable materials for the substrate. Although the substrate 22 is depicted as uniformly comprising a thermoplastic compatible material, it should be appreciated that the outer surface of the substrate 22 may comprise the thermoplastic compatible material while the interior of the substrate 22 may comprise material which is not compatible with thermoplastics.

The coating may be formulated by the reaction product of a thermoplastic, at least one cellulose fiber, and acetone. In one embodiment, these components are mixed together in the following ratios:

thermoplastic approximately 0.2 pounds (91 grams) to approximately 3.0 pounds (1,361 grams) of at least one cellulose fiber per 1 gallon (3.75 liters) of the thermoplastic acetone in an amount of approximately 2% to approximately 8% by weight of the thermoplastic In one particular embodiment, the at least one cellulose fiber comprises a blend of cellulose fibers.

The thermoplastic is a high polymer that softens when exposed to heat and returns to its original condition when cooled to room temperature. The thermoplastic solidifies or cures when heated such that the thermoplastic is cross-linked with the molecular constitutes of the selected cellulose fiber or fibers and the substrate. Acceptable thermoplastics include synthetics such as polyvinyl chlorides, nylons, fluorocarbons, linear polyethylenes, polyurethanes (including polyurethane prepolymer systems), polystyrene, polypropylenes, cellulosics, acrylic resins, acrylics, and combinations thereof. Acrylics and polyurethanes have been found to be particularly suitable. In one implementation, the acrylic may include polymers or copolymers of acrylic acid, methacrylic acid, esters of these acids, or acrylonitrile, for example. Similarly, the polyurethane may be the produced by the condensation reaction of a polisocyanate and a hydroxyl-containing material, e.g., a polyol derived from propylene oxide or trichlorobutylene oxide.

The at least one cellulose fiber may be a natural carbohydrate high polymer (polysaccharide) comprising anhydroglucose units joined by an oxygen linkage to form long molecular chains that are essentially linear. Particularly suitable cellulose fiber or fibers have a fineness between approximately 10 and approximately 70 microns. More preferably, the cellulose fiber or fibers selected have a fineness between approximately 20 and approximately 60 microns. Suitable cellulose fibers include fibers of the *Gossypium* family, *Agave* family, *Cannabis* family, and *Broussonetia* family. By way of example, *Gossypium herbaceum* fibers, which are commonly referred to as cotton fibers, are suitable. Other suitable cellulose fibers include *Agave sisalana* or sisal fibers, *Cannabis sativa* or hemp fibers, and *Broussonetia kazinoki* and *papyrifera* fibers, which are commonly referred to as either mulberry or kozo fibers. Combinations of the aforementioned fibers have been found to be particularly efficacious.

The acetone facilitates the reaction between the thermoplastic and the at least one cellulose fiber. Suitable alternatives to acetone include methyl isobutyl ketone, methyl isobutyl carbinol, methyl methacrylate, and bisphenol-A, for example. Additionally, non-primary components may be added to the coating. By way of example, fillers, anti-aging agents, and coloring agents may be added.

Figure 3:
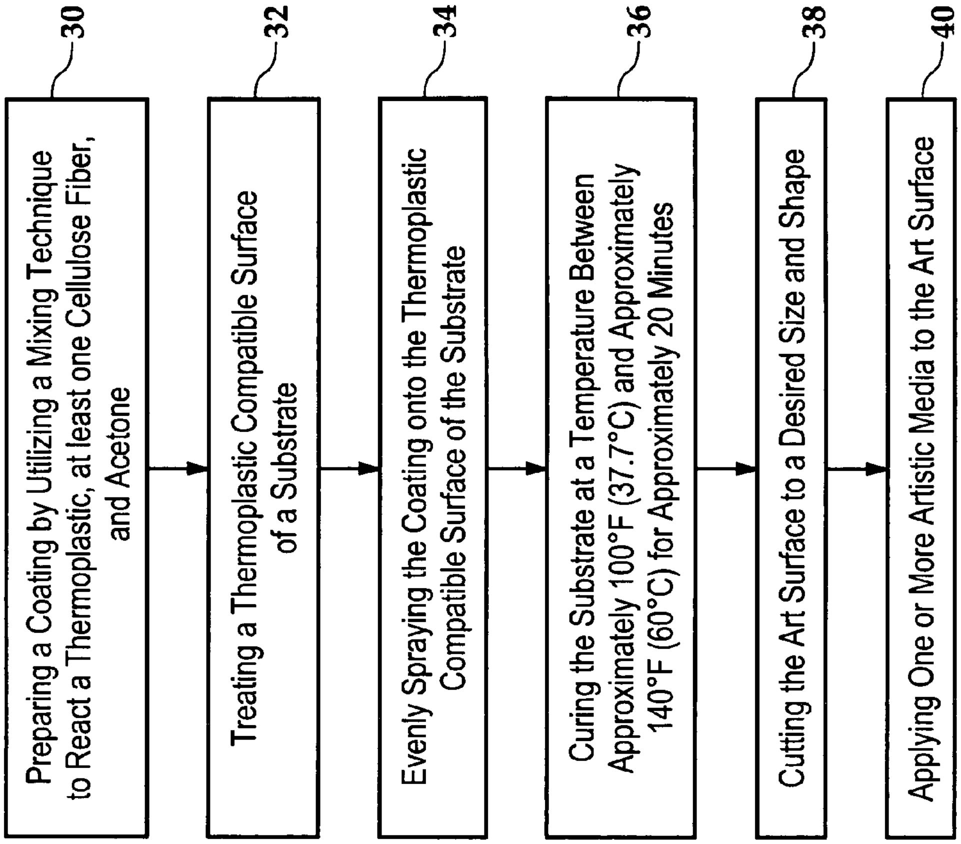
FIG. 3 is a flow chart of one embodiment of a method for preparing an art surface.

In one implementation, aluminum oxide ($Al_2O_3$) in the form of a white powder or lumps of various meshes is utilized in conjunction with the at least one cellulose fiber. Particularly suitable mesh sizes are between approximately 180 and approximately 320. In one embodiment of the aluminum oxide implementation, the components are mixed together in the following ratios:

thermoplastic approximately 0.20 pounds (91 grams) to approximately 3.00 pounds (1,361 grams) of at least one cellulose fiber per 1 gallon (3.75 liters) of the thermoplastic approximately 2.0 pounds (907 grams) to approximately 3.0 pounds (1,361 grams) of aluminum oxide per 1 gallon (3.75 liters) of the thermoplastic acetone in an amount of approximately 2% to approximately 8% by weight of the thermoplastic FIG. 3 depicts one embodiment of a method for preparing an art surface. At block 30, a coating is prepared by mixing a thermoplastic, at least one cellulose fiber, and acetone. In one implementation, as previously discussed, the coating may include non-primary components such as fillers, anti-aging agents, and coloring agents. In another previously discussed implementation, aluminum oxide may be added as well. At block 32, a thermoplastic compatible surface of a substrate is treated with a cleaning agent to remove any existing surface contaminates or static electricity, for example.

At block 34, the coating is evenly sprayed onto the thermoplastic compatible surface of the substrate. At block 36, the substrate is cured at a temperature between approximately 100° F. (37.6° C.) and approximately 140° F. (60° C.) for approximately 20 minutes. It should be appreciated, however, that the curing time varies with curing temperature and the ambient humidity. Accordingly, the curing time may be more or less than 20 minutes. For example, in some instances, the curing time may vary from approximately 18 minutes to approximately 28 minutes. Additional coats may be added as necessary by repeating the operations described in association with blocks 34 and 36.

The art surface may be available in common canvas sizes such as 12"×16", 18"×24", 36"×48", and 48"×72", for example. If the size or shape of the art surface is not acceptable to the artist, at block 38, the art surface is cut to a desired size and shape by scoring the surface with an artist's razor knife. In particular, the art surface may by scored to any particular size and shape including shapes that are elliptical, irregular, or abstract.

The ability to easily customize the size and shape of the canvas is an improvement over existing canvases which are available in standard sized panels or obtainable by-the-yard for customization. Previously, artists who made canvases of a custom size and shape with canvas by-the-yard had to also order or manufacture a custom frame. The art surfaces prepared in accordance with the teachings presented herein eliminate the time and expense involved with preparing custom canvases and custom frames. Moreover, the art surfaces permit the artist to design and use canvases of non-traditional, non-rectangular sizes. At block 40, one or more artistic media are applied to the art surface.

The present invention will now be illustrated by reference to the following non-limiting working examples wherein procedures and materials are solely representative of those which can be employed, and are not exhaustive of those available and operative. The following glossary enumerates the components utilized in the Examples and Test Methods presented hereinbelow.

Acetone is a colorless, volatile liquid, having a chemical formula $CH_3COCH_3$, that is readily available.

*Agave sisalana* fibers of various fineness are readily available in many lengths.

*Broussonetia kazinoki* fibers of various fineness are readily available in many lengths.

*Broussonetia papyrifera* fibers of various fineness are readily available in many lengths.

*Cannabis sativa* fibers of various fineness are readily available in many lengths.

CELTEC® PVC board is an expanded rigid foamed polyvinyl chloride (PVC) sheet available in thicknesses of 1 millimeter to 25 millimeters and different colors including black and white from Compression Polymers Corp. and Vycom Corp. (both of Moosic, Pa.).

*Gossypium herbaceum* fibers of various fineness are readily available in many lengths.

GRIP-FLEX® SOLAR CLEAR™ 266 coating is an acrylic thermoplastic from Akzo Nobel Coatings, Inc. (Norcross, Ga.).

GRIP-GARD VPS-1™ coating is a clear acrylic thermoplastic from Akzo Nobel Coatings, Inc. (Norcross, Ga.) that comprises acrylic resins, solvents, and other ingredients.

KÖMATEX® PVC board is a foamed PVC sheet available in A variety of thicknesses, colors, and sizes from Kömmerling USA, Inc. (Huntsville, Ala.).

MICROGRIT A® grains are blocky, water classified and closely graded, natural color aluminum oxide grains available in meshes of size 8 to size 1200 (FEPA standard) from Micro Abrasives Corporation (Westfield, Mass.).

MICROGRIT WA® grains are high purity, friable, white aluminum oxide grains available in meshes of size 8 to size 600 (FEPA standard) from Micro Abrasives Corporation (Westfield, Mass.).

SINTRA® PVC board is a foamed PVC sheet available in A variety of thicknesses, colors, and sizes from Alcan Composites USA Inc. (St. Louis, Mo.).

T-2004™ reducer is a fast reducer comprising ethanol, butanol, toluene, and other primary components from Akzo Nobel Coatings, Inc. (Norcross, Ga.).

Example I

A coating is prepared by adding the following components to a pressure pot having a mixing element that operates under the power of an electric motor:

- 0.74 lbs (336 grams) of 20 micron *Gossypium herbaceum* fibers
- 1 gallon (3.75 liters), which is 7.4 lbs (3,357 grams), GRIP-GARD VPS-1™ coating
- 0.37 pounds (168 grams), which is approximately 7 ounces (0.21 liters), acetone While the coating is being mixed, a 3 millimeter white CELTEC® PVC board is mounted with a bar and pin arrangement onto a mobile rack. The surface of the CELTEC® PVC board is cleaned using a T-2004™ reducer in combination with soap and water to remove any existing surface contaminates or static electricity, for example. Once the coating is completely mixed and homogeneous, a pressured siphon feed is utilized to uniformly spray the coating onto the CELTEC® PVC board. It should be appreciated, however, that other spray systems or a gravity feed systems may be utilized to apply the coating. In one implementation, the coating is sprayed on from left-to-right and then another coat is sprayed on from right-to-left.

The rack onto which the coated CELTEC® PVC board is mounted is moved into a controlled temperature environment or dry room. The coated CELTEC® PVC board is subjected to a temperature of 120° F. (48.8° C.) for approximately 20 to 24 minutes in order to cure the coating. Once the coating is cured, the coated CELTEC® PVC board is removed from the controlled temperature environment. The coating is inspected and, if necessary, the pressured siphon may be again utilized to uniformly spray another coat or coats of the coating onto the CELTEC® PVC board. Following the application of the additional coats, the coated CELTEC® PVC board is returned to the controlled temperature environment and again subjected to a temperature of 120° F. (48.8° C.) for approximately 20 to 24 minutes in order to cure the second coating. Finally, the coated CELTEC® PVC board, i.e., the art surface, may be cut to the desired size and shape by scoring the art surface with an artist's razor knife.

Example II

The art surface was prepared substantially according to the procedures presented in Example I with the components noted in Table I.

TABLE I

| Art Surface Preparation | |
|---|---|
| Substrate | Coating |
| 6 mm KÖMATEX ® PVC board | 1.11 lbs (839 grams) of 20 micron *Gossypium herbaceum* fibers<br>1 gallon (3.75 liters) GRIP-FLEX ® SOLAR CLEAR ™ 266 coating<br>0.07 pounds (32 grams), which is 1 ounce (0.4 liters), acetone |

Example III

The art surface was prepared substantially according to the procedures presented in Example I with the components noted in Table II.

TABLE II

| Art Surface Preparation | |
|---|---|
| Substrate | Coating |
| 3 mm, colored SINTRA ® PVC board | 2.96 lbs (1,343 grams) of 20 micron *Gossypium herbaceum* fibers<br>1 gallon (3.75 liters) GRIP-GARD VPS-1 ™ coating<br>0.40 pounds (181 grams), which is approximately 8 ounces (0.23 liters), acetone |

Example IV

The art surface was prepared substantially according to the procedures presented in Example I with the components noted in Table III.

TABLE III

| Art Surface Preparation | |
|---|---|
| Substrate | Coating |
| 3 mm CELTEC ® PVC board | 0.37 lbs (168 grams) of 60 micron *Gossypium herbaceum* fibers<br>1 gallon (3.75 liters) GRIP-GARD VPS-1 ™ coating<br>0.40 pounds (181 grams) acetone |

Example V

The art surface was prepared substantially according to the procedures presented in Example I with the components noted in Table IV.

TABLE IV

| Art Surface Preparation | |
|---|---|
| Substrate | Coating |
| 3 mm CELTEC ® PVC board | 1.85 lbs (839 grams) of 15-60 micron *Agave sisalana* fibers<br>1 gallon (3.75 liters) GRIP-GARD VPS-1 ™ coating<br>0.37 pounds (168 grams) acetone |

Example VI

The art surface was prepared substantially according to the procedures presented in Example I with the components noted in Table V.

TABLE V

| Art Surface Preparation | |
|---|---|
| Substrate | Coating |
| 3 mm CELTEC ® PVC board | 0.74 lbs (336 grams) of 15-60 micron *Broussonetia kazinoki* fibers<br>1 gallon (3.75 liters) GRIP-GARD VPS-1 ™ coating<br>0.37 pounds (168 grams) acetone |

Example VII

The art surface was prepared substantially according to the procedures presented in Example I with the components noted in Table VI.

TABLE VI

| Art Surface Preparation | |
|---|---|
| Substrate | Coating |
| 3 mm CELTEC ® PVC board | 2.96 lbs (1,343 grams) of 15-60 micron *Broussonetia papyrifera* fibers<br>1 gallon (3.75 liters) GRIP-GARD VPS-1 ™ coating<br>0.37 pounds (168 grams) acetone |

Example VIII

The art surface was prepared substantially according to the procedures presented in Example I with the components noted in Table VII.

TABLE VII

| Art Surface Preparation | |
|---|---|
| Substrate | Coating |
| 3 mm CELTEC ® PVC board | 0.74 lbs (336 grams) of 15-60 micron *Cannabis sativa* fibers<br>1 gallon (3.75 liters) GRIP-GARD VPS-1 ™ coating<br>0.40 pounds (181 grams) acetone |

TABLE VII-continued

Example IX

The art surface was prepared substantially according to the procedures presented in Example I with the components noted in Table VIII.

TABLE VIII

| Art Surface Preparation | |
|---|---|
| Substrate | Coating |
| 3 mm CELTEC ® PVC board | 0.74 lbs (336 grams) of 15-60 micron *Agave sisalana* fibers<br>0.74 lbs (336 grams) of 15-60 micron *Broussonetia papyrifera* fibers<br>0.74 lbs (336 grams) of 15-60 micron *Cannabis sativa* fibers<br>0.74 lbs (336 grams) of 15-60 micron *Gossypium herbaceum* fibers<br>1 gallon (3.75 liters) GRIP-GARD VPS-1 ™ coating<br>0.40 pounds (181 grams) acetone |

Example X

The art surface was prepared substantially according to the procedures presented in Example I with the components noted in Table IX.

TABLE IX

| Art Surface Preparation | |
|---|---|
| Substrate | Coating |
| 3 mm CELTEC ® PVC board | 0.74 lbs (336 grams) of 15-60 micron *Cannabis sativa* fibers<br>0.74 lbs (336 grams) of 15-60 micron *Gossypium herbaceum* fibers<br>1 gallon (3.75 liters) GRIP-GARD VPS-1 ™ coating<br>0.40 pounds (181 grams) acetone |

Example XI

The art surface was prepared substantially according to the procedures presented in Example I with the components noted in Table X.

TABLE X

| Art Surface Preparation | |
|---|---|
| Substrate | Coating |
| 3 mm CELTEC ® PVC board | 0.74 lbs (336 grams) of 15-60 micron *Cannabis sativa* fibers<br>2.2 pounds (1007 grams) |

TABLE X-continued

| Art Surface Preparation | |
|---|---|
| Substrate | Coating |
| | MICROGRIT WA ® No. 240 mesh grains<br>1 gallon (3.75 liters) GRIP-GARD VPS-1 ™ coating<br>0.40 pounds (181 grams) acetone |

Example XII

The art surface was prepared substantially according to the procedures presented in Example I with the components noted in Table XI.

TABLE XI

| Art Surface Preparation | |
|---|---|
| Substrate | Coating |
| 3 mm CELTEC ® PVC board | 0.74 lbs (336 grams) of 15-60 micron *Cannabis sativa* fibers<br>2.5 pounds (1,134 grams) MICROGRIT A ® No. 320 mesh grains<br>1 gallon (3.75 liters) GRIP-GARD VPS-1 ™ coating<br>0.40 pounds (181 grams) acetone |

Test Method I. An art surface was prepared in accordance with Example I. Water color paints were applied to the art surface. The art surface accepted the medium while permitting the artist to modify and remove portions of the medium from the art surface during development of the work. The final work was observed for cracking, warping, and integrity over a period of six months. Table XII describes the test results.

TABLE XII

| Results of Test Method I | | | |
|---|---|---|---|
| | Cracking | Warping | Loss of Integrity |
| 1 Week | No | No | No |
| 2 Weeks | No | No | No |
| 1 Month | No | No | No |
| 2 Months | No | No | No |
| 3 Months | No | No | No |

Test Method II. An art surface was prepared in accordance with Example IV. Oil and water color paints as well as pencil were applied to the art surface. The art surface accepted the mixed media while permitting the artist to modify and remove portions of the medium from the art surface during development of the work. The final work was observed for cracking, warping, and integrity over a period of six months. Table XIII describes the test results.

TABLE XIII

| Results of Test Method II | | | |
|---|---|---|---|
| | Cracking | Warping | Loss of Integrity |
| 1 Week | No | No | No |
| 2 Weeks | No | No | No |
| 1 Month | No | No | No |
| 2 Months | No | No | No |
| 3 Months | No | No | No |

Moreover, the art surfaces of Examples II-XII exhibited test results equivalent to the art surface prepared according to Example I. Further, the art surfaces of Examples I-XII exhibited similar test results for other medium including acrylic, chalk, charcoal, colored pencil, conte, dyes, egg tempera, pastel, water color, and combinations thereof. The results of the testing illustrate that the art surfaces having the thermoplastic/cellulose fiber-based coating prepared in accordance with the teachings presented herein exhibit physical and chemical properties that are equivalent or better than those of existing artist's board with respect to a particular medium and superior to existing artist's boards with respect to their compatibility with a wide variety of media including mixed media.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An art surface for use by an artist developing a work, the art surface comprising:

an easel;

a foamed sheet substrate having a thermoplastic compatible surface, the foamed sheet substrate selected from the group consisting of polyvinyl chloride substrates and acrylonitrile butadiene styrene substrates, the foamed sheet substrate being of a canvas size and sized to be supported by the easel; and a sprayable coating disposed on the thermoplastic compatible surface, the coating including a reaction product of a thermoplastic resin and at least one cellulose fiber, the coating is operable to accept an artistic medium, the artistic medium being selected from the group consisting of chalk, charcoal, colored pencil, conte, dyes, egg tempera, oil, pastel, and mixed media combinations thereof, wherein the coating permanently accepts the artistic medium following a period permitting the artist to modify and remove portions of the artistic medium from the coating during development of the work.

2. The art surface as recited in claim 1, wherein the coating is cured prior to an application of the artistic medium.

3. The art surface as recited in claim 1, wherein the at least one cellulose fiber is reacted in a ratio of approximately 0.2 pounds (91 grams) to approximately 3.0 pounds (1,361 grams) per 1 gallon (3.75 liters) of the thermoplastic resin.

4. The art surface as recited in claim 1, wherein the at least one cellulose fiber comprises a blend of cellulose fibers.

5. The art surface as recited in claim 1, wherein the thermoplastic resin comprises an acrylic coating.

6. The art surface as recited in claim 1, wherein the at least one cellulose fiber comprises a material selected from the group consisting of the *Gossypium* family, *Agave* family, *Cannabis* family, and *Broussonetia* family.

7. The art surface as recited in claim 1, wherein the reaction product of the coating further comprises acetone.

8. An art surface for use by an artist developing a work, the art surface comprising:

a foamed sheet substrate having a thermoplastic compatible surface, the foamed sheet substrate selected from the group consisting of polyvinyl chloride substrates and acrylonitrile butadiene styrene substrates, the foamed sheet substrate being of a canvas size and sized to be supported by an easel;

a sprayable coating disposed on the thermoplastic compatible surface, the coating including a reaction product of a thermoplastic resin and at least one cellulose fiber, the coating is operable to accept an artistic medium, the artistic medium being selected from the group consisting of chalk, charcoal, colored pencil, conte, dyes, egg tempera, oil, pastel, and mixed media combinations thereof; and the art surface in the form of a canvas having the sprayable coating for accepting the artistic medium, wherein the coating permanently accepts the artistic medium following a period permitting the artist to modify and remove portions of the artistic medium from the coating during development of the work.

9. The art surface as recited in claim 8, wherein the coating is cured prior to an application of the artistic medium.

10. The art surface as recited in claim 8, wherein the at least one cellulose fiber is reacted in a ratio of approximately 0.2 pounds (91 grams) to approximately 3.0 pounds (1,361 grams) per 1 gallon (3.75 liters) of the thermoplastic resin.

11. The art surface as recited in claim 8, wherein the at least one cellulose fiber comprises a blend of cellulose fibers.

12. The art surface as recited in claim 8, wherein the thermoplastic resin comprises an acrylic coating.

13. The art surface as recited in claim 8, wherein the at least one cellulose fiber comprises a material selected from the group consisting of the *Gossypium* family, *Agave* family, *Cannabis* family, and *Broussonetia* family.

14. The art surface as recited in claim 8, wherein the reaction product of the coating further comprises acetone.

15. An art surface for use by an artist developing a work, the art surface comprising:

a foamed sheet substrate having a thermoplastic compatible surface, the foamed sheet substrate selected from the group consisting of polyvinyl chloride substrates and acrylonitrile butadiene styrene substrates;

a sprayable coating disposed on the thermoplastic compatible surface, the coating including a reaction product of a thermoplastic resin and at least one cellulose fiber, the coating is operable to accept an artistic medium, the artistic medium being selected from the group consisting of chalk, charcoal, colored pencil, conte, dyes, egg tempera, oil, pastel, and mixed media combinations thereof; and the art surface in the form of a canvas having the sprayable coating for accepting the artistic medium, wherein the coating permanently accepts the artistic medium following a period permitting the artist to modify and remove portions of the artistic medium from the coating during development of the work.

16. The art surface as recited in claim 15, wherein the coating is cured prior to an application of the artistic medium.

17. The art surface as recited in claim 15, wherein the at least one cellulose fiber is reacted in a ratio of approximately 0.2 pounds (91 grams) to approximately 3.0 pounds (1,361 grams) per 1 gallon (3.75 liters) of the thermoplastic resin.

18. The art surface as recited in claim 15, wherein the at least one cellulose fiber comprises a blend of cellulose fibers.

19. The art surface as recited in claim 15, wherein the thermoplastic resin comprises an acrylic coating.

20. The art surface as recited in claim 15, wherein the at least one cellulose fiber comprises a material selected from the group consisting of the *Gossypium* family, *Agave* family, *Cannabis* family, and *Broussonetia* family.

21. The art surface as recited in claim 15, wherein the reaction product of the coating further comprises acetone.

22. An art surface for use by an artist developing a work, the art surface comprising:

a foamed sheet substrate having a thermoplastic compatible surface, the foamed sheet substrate selected from the group consisting of polyvinyl chloride substrates and acrylonitrile butadiene styrene substrates, the foamed sheet substrate being of a canvas size and sized to be supported by an easel;

a sprayable coating disposed on the thermoplastic compatible surface, the coating including a reaction product of a thermoplastic resin and at least one cellulose fiber, the coating is operable to accept an artistic medium, the artistic medium being selected from the group consisting of chalk, charcoal, colored pencil, conte, dyes, egg tempera, oil, pastel, and mixed media combinations thereof;

the coating being cured prior to an application of the artistic medium; and the coating permanently accepting the artistic medium following a period permitting the artist to modify and remove portions of the artistic medium from the coating during development of the work, wherein the at least one cellulose fiber is reacted in a ratio of approximately 0.2 pounds (91 grams) to approximately 0.74 pounds (336 grams) per 1 gallon (3.75 liters) of the thermoplastic resin.

* * * * *